United States Patent Office 3,764,274
Patented Oct. 9, 1973

3,764,274
VANADIUM EXTRACTION USING MIXTURE OF ALKYL PHOSPHINE OXIDES AND FLUORINATED β-DIKETONES
Michael F. Lucid, Oklahoma City, Okla., assignor to Kerr-McGee Corporation, Oklahoma City, Okla.
No Drawing. Original application Sept. 4, 1970, Ser. No. 69,949, now abandoned. Divided and this application Nov. 22, 1971, Ser. No. 201,228
Int. Cl. B01d 11/04; C01g 31/00
U.S. Cl. 423—63
5 Claims

ABSTRACT OF THE DISCLOSURE

A method for the extraction of vanadium from acidic mixtures is provided which comprises extracting the vanadium with a novel two component extractant mixture containing, as one component, at least one compound selected from the group consisting of amines and phosphine oxides and, as the other component, a fluorinated β-diketone. The extraction is effected in a water-immiscible organic solvent, the vanadium being complexed with the novel extractant mixture and being extracted into the organic phase.

BACKGROUND OF THE INVENTION

This application is a division of Ser. No. 69,949, filed Sept. 4, 1970, now abandoned.

Phosphoric acid generally is produced commercially by one of two methods. One method is called the "furnace" method; the other is referred to as the "wet process" method. In the wet process method, phosphate rock is contacted with a mineral acid such as sulfuric acid. Most phosphate rock contains metal compounds in varying amounts. In many cases these metal compounds are dissolved from the phosphate rock and appear in the wet process acid as contaminants. Vanadium compounds are among those dissolved from the phosphate rock, particularly when the rock is from the so-called Western phosphate deposits of Idaho, Wyoming, Utah, and Montana.

Vanadium is an undesirable component of wet process phosphoric acid in that it prevents the use of the phosphoric acid in making animal feed supplements, as the amount of vanadium must be kept at a low level in such animal feed supplements.

On the other hand, vanadium itself is a valuable material and wet process phosphoric acid can be an important source of this material. Therefore, a process for the recovery of vanadium from wet process phosphoric acid provides an important benefit, in that the vanadium is converted from an undesirable contaminant to a valuable by-product.

Heretofore, attempts have been made to recover vanadium from wet process phosphoric acid. One involves addition of a soluble ferrocyanide compound to the acid to precipitate the vanadium, as described more fully in U.S. Pat. No. 1,544,911. Other such processes involve extraction of the acid with an organic extractant for the vanadium. U.S. Pat. No. 2,211,119 describes a process in which the preferred organic extractant is isopropyl ether. U.S. Pat. No. 3,437,454 describes a process in which the preferred organic extractant is an alpha-hydroxy oxime.

Other commercial process streams which contain vanadium exist. For instance, leaching of uranium ores with sulfuric acid frequently results in solutions containing vanadium, uranium, and iron. Another source of vanadium is ferrophosphorus, a by-product from electric furnace production of elemental phosphorus. Ferrophosphorus is rotated usually with salt or limestone and leached with water or acid. Further processing of these solutions by precipitation usually leaves low grade vanadium solutions which are sometimes processed by solvent extraction.

Amines and ammonium salts have been used for the recovery of these vanadium values from acidic solutions, but below pH 1.3, vanadium is not extracted in significant amounts, and some residual vanadium is frequently left is the aqueous raffinate even at a higher pH.

Accordingly, improved processes are the effort of much research to recover vanadium from commercial sources under favorable conditions and in improved yields.

SUMMARY OF THE INVENTION

In accordance with this invention, it has been discovered that vanadium ions can be extracted in extremely high yields and without the formation of an unacceptable raffinate by extraction of the acid with a novel two component extractant mixture. One component comprises at least one compound selected from the group consisting of amines and phosphine oxides and the other is a fluorinated β-diketone component. The vanadium values are extracted from an acidic solution having a pH from about 0.1 to 3.0 using the novel extractant mixture in an organic solvent, the vanadium values being extracted into an organic phase which forms and is immiscible with an acidic-aqueous phase. The vanadium can thereafter be recovered from the organic phase.

According to this invention, an acidic solution containing vanadium ions in the tetravalent and pentavalent oxidation state is contacted with a solution of the organic extractant in any desired concentration in a water-immiscible diluent.

The organic and aqueous phases are allowed to separate. The aqueous phase (raffinate) is returned to the acid plant or discarded.

The loaded organic phase may be scrubbed with an aqueous solution at some desirable pH to remove coextracted impurities while leaving the vanadium loaded in the organic phase. The aqueous scrub solution may be recycled or discarded as desired. The organic phase goes on to vanadium recovery.

The scrubbed organic is stripped to leave a vanadium concentrate.

The vanadium present in the solution to be extracted normally is in the tetravalent or pentavalent state, or mixtures thereof. The two component extractant mixture of this invention is particularly effective for use in extracting the vanadium in such valence states. Thus, the amine-phosphine oxide component extracts the vanadium (V) while the syngeristic combination of the two components has been found to extract vanadium (IV).

As disclosed herein, one component of the extractant mixture comprises organic amines which may be primary, secondary, tertiary, and quaternary amines and/or phosphine oxides. The amines may be used either alone or in mixtures thereof and may contain from about 10 to 50 carbon atoms. Particularly preferred amines and phosphine oxides are alkyl amines and alkyl phosphine oxides which contain from about 18 to about 40 carbon atoms.

Examples of suitable primary amines include a mixture of C–18 to C–22 aliphatic primary amines. Aliphatic amines corresponding to such a mixture include "Primene JMT" (Rohm & Haas Co.). One of the preferred amines of this mixture which may also be used alone is a C–20 primary alkylamine of the formula

$H[CH_2C(CH_3)_2]_5NH_2$

Also illustrative of suitable primary amines is a mixture of C–12 to C–14 primary alkylamines. A commercially available mixture of such amines is "Primene 81–R" (Rohm & Haas Co.). A typical amine of this mixture is the C–12 alkylamine of the formula $$H[CH_2C(CH_3)_2]_3NH_2$$

Examples of suitable secondary amines include bis(1-isobutyl-3,5-dimethyl-hexyl) amine, and mixtures of N-dodecyl(trialkylmethyl) amines and mixtures of N-lauryl (trialkylmethyl) amines. Examples of mixtures of N-dodecenyl(trialkylmethyl) amines are those which are a C-12 to C-15 homologous mixture such as "Amberlite LA-1" (Rohm & Haas Co.). An amine of this mixture which also may be used alone has the formula $$(CH_3)_3CCH_2(CH_3)_2CH_2CH:$$
$$CHCH_2NH(CH_3)_2CH_2C(CH_3)CH_2C(CH_3)_3$$

Mixtures of N-lauryl(trialkylmethyl) amines include homologous mixtures of C-12 to C-15 amines such as "Amberlite LA-1" (Rohm & Haas Co.). A typical amine of this mixture has the formula $$CH_3(CH_2)_{11}NHC(CH_3)_2CH_2C(CH_3)_2CH_2C(CH_3)_3$$

Examples of suitable tertiary amines include tricaprylyl- amine, trilauryl amine, triisooctyl amine, tritridecyl amine and mixtures of tertiary amines, such as a mixture of C-8, C-10 and C-12 tertiary alkyl amines commercially available as "Adogen 368" (Ashland Chemical Co.).

Examples of suitable quaternary amines are tricaprylylmethyl ammonium chloride and tritridecylmethyl ammonium chloride.

Examples of alkyl phosphine oxides include tri-n-octylphoshpine oxide, tri-n-decylphosphine oxide and tris(2-ethylhexyl) phosphine oxide.

The fluorinated β-diketone component of the extractant mixture is represented by the formula:

$$R-\overset{O}{\overset{\|}{C}}-CH_2-\overset{O}{\overset{\|}{C}}(CF_2)_nCF_3$$

wherein R is a radical selected from the group consisting of (a) aromatic radicals containing from 6 to 14 ring carbon atoms, which may contain conventional substituents such as alkyl, halo, nitro, alkoxy, and amino groups;
(b) heterocyclic radicals containing five and six ring members wherein from one to two of the ring members may be selected from the group consisting of oxygen, sulfur and nitrogen, and which may contain conventional substituents such as alkyl, halo, nitro, alkoxy and amino groups; and
(c) aliphatic and substituted aliphatic radicals;

and $n$ has a value of 0 to 15.

The fluorinated β-diketones are characterized high oxidative stability, resistance to acidic hydrolysis, relatively high intrinsic acidity of the enolic hydrogen, and powerful chelating ability.

Examples of R as an aromatic radical include phenyl, naphthyl, diphenyl and anthracyl. Examples of alkyl substituents on said aromatic radical include methyl, ethyl, n-propyl, iso-propyl, n-butyl, iso-butyl, sec-butyl, tert-butyl, n-octyl, and iso-octyl. Alkoxy groups include methoxy, propoxy, butoxy, and octyloxy. The halo substituents are fluoro, chloro, bromo and iodo. According to a preferred embodiment of the present invention, the halo substituent is fluoro.

Examples of R as a heterocyclic radical include derivatives of furan, tetrahydrofuran, isooxazole, oxazole, oxaxolidine, thiazole, pyrazole, pyrrole, thiophene, morpholine, oxazine, pyrazine and piperidine.

The preferred heterocyclic groups of the above formula are represented by

[heterocyclic ring structure with X]

wherein X is sulfur, oxygen or nitrogen.

As examples of R as an aliphatic radical may be mentioned methyl, ethyl isopropyl, octyl, and dodecyl.

Examples of the perfluoro aliphatic radical $$-(CF_2)_nCF_3$$

are fluoro substituted straight and branched chain alkyl groups when $n$ is 0 to 15. Examples of such groups include perfluoro derivatives of methyl, ethyl, n-propyl, n-butyl, iso-butyl, tert-butyl, n-hexyl, n-octyl, iso-octyl, n-decyl, and n-dodecyl.

According to a preferred aspect of the invention, the component of the above formula contains a perfluoroaliphatic group wherein $n$ is a positive integer.

According to a further preferred embodiment of the present invention, $n$ is a positive integer from 1 to 10.

Examples of particular extractants of the above formula are the following:

[thienyl]-C(O)-CH$_2$C(O)CF$_2$CF$_3$

[thienyl]-C(O)-CH$_2$C(O)CF$_2$CF$_2$CF$_3$

[thienyl]-C(O)-CH$_2$C(O)CF$_2$CFCF$_2$CF$_3$ with CF$_3$ branch (CF$_2$CF$_3$)

[thienyl]-C(O)-CH$_2$C(O)CF$_2$CF$_2$CF$_2$CF$_2$CF$_2$CF$_2$CF$_2$CF$_3$

[phenyl]-C(O)-CH$_2$C(O)CF$_2$CF$_3$

[naphthyl]-C(O)-CH$_2$C(O)CF$_3$

[3,5-dichlorophenyl]-CCH$_2$C(O)CF$_2$CF$_3$

[pyrrolyl]-CCH$_2$C(O)CF$_2$CF$_3$

[furanyl]-CCH$_2$C(O)CF$_2$CF$_2$CF$_3$

[pyridyl]-N-CCH$_2$C(O)CF$_2$CF$_3$

[morpholino]-N-CCH$_2$C(O)CF$_2$CF$_2$CF$_3$

[naphthyl]-CCH$_2$C(O)CF$_2$CF$_2$CF$_2$CF$_2$CF$_2$CF$_2$CF$_2$CF$_2$CF$_3$

[isoxazolyl]-CCH$_2$C(O)CF$_2$CF$_3$ $$(CH_3)_3C-C(O)CH_2C(O)CF_2CF_2CF_3$$

The molar ratio of the two components within the extraction mixture may vary widely, depending on the relative ratio of vanadium (IV) to vanadium (V) and the pH of the particular solution in question.

Other modifiers may optionally be added to the extractant mixture, such as tributylphosphate.

Other metals in addition to vanadium may be coextracted from the solution through proper use of the novel extractant mixture of the present invention if this is desirable. For instance, iron (III) can be coextracted with the vanadium. The amount of the novel extractant mixture relative to the amount of the water-immiscible organic solvent may vary widely. Generally, the total amount of the novel extractant mixture will vary from about 1% to 50% by weight based on the total weight of the organic phase. A preferred percentage range is from 2% to 15%. The ratio of the organic phase to the acidic phase is not critical.

The term "water-immiscible organic solvent" as used herein refers to an organic material normally liquid at ambient temperatures which is substantially, but not necessarily entirely, insoluble in water. The preferred organic solvents for the process of the present invention are hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents), "Napoleum 470" (commercially available petroleum naphtha), and the like. Solvents which contain functional groups can also be employed providing that the functional groups do not adversely affect the extraction. Thus, chlorinated and fluorinated hydrocarbons such as carbon tetrachloride, trichloroethylene, and perfluorokerosene may be used.

The pH of the acidic solution containing the vanadium may vary between about pH 0.1 and about pH 3, and is preferably between pH 0.5 and pH 2.3.

The foregoing description and the following specific examples are for purposes of illustration, and are not to be considered as limiting the scope of the present invention, reference being had to the appended claims for this purpose.

Examples I–IV are illustrative of the method of preparing certain fluorinated β-diketones which comprise one of the extractants of this invention.

EXAMPLE I 4,4,4-trifluoro-1-pentafluorophenyl-1,3-butanedione

Dried sodium methoxide (0.1 mole) was suspended in anhydrous ether (100 ml.). Ethyl trifluoroacetate (14.2 g., 0.1 mole) in anhydrous ether (15 ml.) was added dropwise to the stirred suspension. During the exothermic reaction, nearly all of the sodium methoxide reacted. Acetylpentafluorobenzene (21.0 g., 0.1 mole) in anhydrous ether (15 ml.) was added dropwise. This reaction was exothermic and the remainder of the sodium methoxide reacted. The resultant yellow, homogeneous reaction mixture was allowed to stand at room temperature overnight under a nitrogen blanket. Work-up was effected by addition of concentrated sulfuric acid (3 ml.) in water (30 ml.) followed by extraction with ether and washing with water. The ethereal extract was dried over anhydrous sodium sulfate and evaporated in vacuo. The crude product was distilled through a column packed with glass helices, 14.8 g., B.P. 77–79°/4.7 torr (48.4 percent yield). A gas chromatogram (150°, 2 meter 20 percent SF–96 on Chromosorb P) of the pure liquid showed retention time of 5.6 min. An infrared spectrum (oil smear) of the compound showed strong absorption centered at 1620 cm.$^{-1}$ (C=O) and a broad region centered at 1180 cm.$^{-1}$ (C—F). The UV spectrum indicated $$\lambda_{maximum}^{n-hexane} \ 289 \ m\mu \ (\epsilon \ 10,820)$$

The NMR spectrum (ref., Si(CH$_3$)$_4$) possessed a broad peak of chemical shift 13.7 p.p.m. for the enolic hydrogen and a sharp singlet at 6.2 p.p.m. for the olefinic hydrogen. A $^{19}$F NMR spectrum (ref., Freon 11) displayed a peak of chemical shift 76.8 p.p.m. for the methyl fluorines and peaks at 137.6 p.p.m., and 159.3 p.p.m. for the ortho, para, and meta aromatic fluorines, respectively.

Analysis.—Calcd. for C$_{10}$H$_2$F$_8$O$_2$ (percent): C, 39.23; H, 0.66; F, 49.65. Found (percent): C, 39.31; H, 0.69; F, 49.60.

EXAMPLE II 4,4,5,5,5-pentafluoro-1-pentafluorophenyl-1,3-pentanedione

Dried sodium methoxide (0.1 mole) was suspended in anhydrous ether (100 ml.) and ethyl perfluoropropionate (19.2 g., 0.1 mole) in anhydrous ether (15 ml.) was added dropwise to the stirred slurry. The reaction was exothermic and nearly all of the sodium methoxide was consumed. Dropwise addition of acetylperfluorobenzene (21.0 g., 0.1 mole) in anhydrous ether (15 ml.) caused an exothermic reaction. The rest of the sodium methoxide reacted and the reaction mixture turned yellow. After allowing the homogeneous reaction mixture to stand at room temperature overnight under a nitrogen blanket, 3 ml. of concentrated sulfuric acid and 30 ml. of water was added. The mixture was extracted with ether and the extracts washed with water. The ether solution was dried over anhydrous sodium sulfate and evaporated in vacuo. The crude product was distilled through a Vigreaux column to give 12.4 g., B.P. 83–98°/2.9 torr, which contained some higher boiling impurities, as shown by gas chromatography (150° C., 2 meters 20 percent SF–96 on Chromosorb P). This material was chromatographed on silica gel in benzene. The course of elution was followed by gas chromatography. In this way 9.7 g. (27.2 percent yield) of pure compound was isolated; however, it was red-orange in color. The color was easily removed by a flash distillation. An infrared spectrum (oil smear) of the pure compound showed strong absorption centered at 1620 cm.$^{-1}$ (C=O) and a broad region centered at 1200 cm.$^{-1}$ (C—F). The UV spectrum indicated $$\lambda_{maximum}^{n-hexane} \ 292 \ m\mu \ (\epsilon \ 12,120)$$

The NMR spectrum (ref., Si(CH$_3$)$_4$) displayed a very sharp singlet of chemical shift 13.9 p.p.m. for the enolic hydrogen and a sharp singlet at 6.3 p.p.m. for the olefinic hydrogen. A $^{-19}$F NMR spectrum (ref., Freon 11) displayed a peak of chemical shift 82.9 p.p.m. for the methyl fluorines, a peak at 124.6 p.p.m. for the methylene fluorines, and peaks at 139.3 p.p.m., 148.0 p.p.m., and 161.0 p.p.m. for the ortho, para, and meta aromatic fluorines, respectively Analysis.—Calcd. for C$_{11}$H$_2$F$_{10}$O$_2$ (percent): C, 37.10; H, 0.57; F, 53.35. Found (percent): C, 37.28; H, 0.72; F, 53.40.

EXAMPLE III 4,4,5,5,6,6,6-heptafluoro-1-pentafluorophenyl-1,3-hexanedione

Dried sodium methoxide (0.1 mole) was suspended in anhydrous ether (100 ml.) and ethyl perfluorobutyrate (24.2 g., 0.1 mole) in anhydrous ether (15 ml.) was added dropwise to the stirred suspension. The reaction was exothermic and nearly all of the sodium methoxide reacted. The reaction mixture was cooled in an ice bath before the acetylperfluorobenzene (21.0 g., 0.1 mole) was added dropwise in anhydrous ether (100 ml.) over 1 hr. After complete addition, the reaction mixture was allowed to warm to room temperature. There was no noticeable evolution of heat, but the reaction mixture slowly turned yellow as it warmed up. The reaction mixture was allowed to stand at room temperature overnight under a nitrogen blanket. Work-up was effected by addition of concentrated sulfuric acid (3 ml.) in water (30 ml.) followed by extraction with ether and washing with water. The ether extract was dried over anhydrous sodium sulfate and evaporated in vacuo. The crude product was distilled through a column packed with glass helices, 25.0 g., B.P. 88–89°/3.4 torr (62 percent yield). A gas chromatogram (150°, 2 meter 20 percent SF–96 on Chromosorb P) of the pure liquid showed a retention time of 4.9 min. An infrared spectrum (oil smear) of the compound showed strong absorption band at 1625 cm.$^{-1}$ (C=O) and a broad region centered at 1202 cm.$^{-1}$ (C—F). The UV spectrum indicated $$\lambda^{\text{n-hexane}}_{\text{maximum}}\ 292\ m\mu\ (\epsilon\ 12{,}550)$$

The NMR spectrum (ref., Si(CH$_3$)$_4$) displayed a sharp peak of chemical shift at 13.9 p.p.m. for the enolic hydrogen and a sharp singlet at 6.2 p.p.m. for the olefinic hydrogen. A $^{19}$F NMR spectrum (ref., Freon 11) displayed a peak of chemical shift at 80.7 p.p.m. for the methyl fluorines, peaks at 121.5 p.p.m. and 126.7 p.p.m. for the methylene fluorines, and peaks at 138.0 p.p.m., 147.6 p.p.m., and 160.1 p.p.m. for the ortho, para, and meta aromatic fluorines, respectively.

*Analysis.*—Calcd. for C$_{12}$H$_2$F$_2$O$_2$ (percent): C, 35.49; H, 0.50; F, 56.14. Found (percent): C, 35.36; H, 0.97; F, 56.09.

EXAMPLE IV 4,4,5,5,6,6,7,7,8,8,9,9,10,10,10-pentadecafluoro-1-pentafluorophenyl-1,3-decanedione Sodium methoxide was prepared in situ by adding sodium metal (2.4 g., 0.1 mole) to anhydrous methanol (50 ml.). After complete reaction the excess methanol was distilled and the salt was thoroughly dried by a stream of nitrogen. The sodium methoxide was suspended in anhydrous ether (100 ml.) and ethyl perfluorocapyrlate (44.1 g., 0.1 mole) in anhydrous ether (25 ml.) was added dropwise to the stirred suspension. The reaction was exothermic and nearly all of the sodium methoxide reacted. The reaction mixture was cooled in an ice bath before the acetylperfluorobenzene (21.0 g., 0.1 mole) was added dropwise in anhydrous ether (100 ml.) over 1 hr. After complete addition the reaction mixture was allowed to warm to room temperature. Although there was no noticeable evolution of heat, the reaction mixture slowly turned yellow as it warmed up. After allowing the reaction mixture to stand at room temperature overnight under a nitrogen blanket, a solution of 3 ml. of concentrated sulfuric acid in 30 ml. water was added. Following extraction with ether, washing with water, and drying over anhydrous sulfate, the ether extract was evaporated in vacuo. The crude product was distilled through a column packed with glass helices, 22.2 g., B.P. 107–110°/1.2 torr (37 percent yield). A gas chromatogram (200°, 2 meter 20 percent SF–96 on Chromosorb P) indicated one major peak with a retention time of 5.5 min. for the product, and one minor peak of higher boiling impurity. An NMR spectrum (ref., Si(CH$_3$)$_4$) showed a very sharp peak of chemical shift at 13.9 p.p.m. for the enolic hydrogen and a peak at 6.2 p.p.m. for the olefinic hydrogen. The integrals of the two major peaks were in good agreement with theory (1:1). A $^{19}$F NMR spectrum (ref., Freon 11) displayed a peak of chemical shift at 80.7 p.p.m. for the methyl fluorines, a region from 119.8 p.p.m. to 125.4 p.p.m. for the methylene fluorines, and peaks at 137.1 p.p.m., 146.3 p.p.m., and 159.2 p.p.m. for the ortho, para, and meta aromatic fluorines, respectively. An infrared spectrum showed strong absorption centered at 1620 cm.$^{-1}$ (C=O) and a broad region centered at 1220 cm.$^{-1}$ (C—F). The UV spectrum indicated $$\lambda^{\text{n-hexane}}_{\text{maximum}}\ 293\ m\mu\ (\epsilon\ 11{,}650)$$

*Analysis.*—Calcd. for C$_{16}$H$_2$F$_{20}$O$_2$ (percent): C, 31.70; H, 0.33; F, 62.69. Found (percent): C, 31.76; H, 0.59; F, 62.25.

Other fluorinated β-diketones which are suitable as extractants in this invention may be prepared by reacting an aromatic or heterocyclic compound containing an acetyl moiety with a lower alkyl ester of a perfluorinated aliphatic acid via the well-known Claisen condensation:

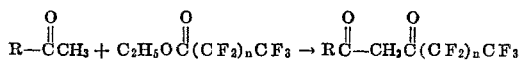

wherein R and $n$ are as previously defined. The reaction is generally conducted in the presence of an alkoxide such as sodium methoxide or sodium ethoxide as a catalyst, in the presence of an inert organic solvent. Typical inert organic solvents are diethyl ether and tetrahydrofuran.

EXAMPLE V

This example illustrates the recovery of vanadium from an acidic leach liquor using an amine without a fluorinated β-diketone being present. Ferrophosphorus was calcined in accordance with the procedure disclosed in U.S. Pat. 3,376,103 and subsequently leached with sulfuric acid to give an aqueous solution having a pH=1.97, EMF =743 and a vanadium content (V$_2$O$_5$) of 9.72 grams/liter. This aqueous solution was then contacted five times with equal volumes of freshly prepared organic extractant solution consisting of a 0.05 M tricaprylyl amine ("Alamine 336") with 8% tributylphosphate. The organic solvent was "Napoleum 470." The results of this experiment are tabulated below:

|  | Raffinate V$_2$O$_5$(g./l.) | Percent extraction | |
|---|---|---|---|
|  |  | Per stage | Cumulative |
| Stage: |  |  |  |
| 0 | 9.72 |  |  |
| 1 | 2.45 | 74.8 | 74.8 |
| 2 | 0.61 | 75.1 | 93.7 |
| 3 | 0.33 | 45.9 | 96.6 |
| 4 | 0.23 | 30.3 | 97.6 |
| 5 | 0.19 | 17.4 | 98.0 |

It will be noted that 98% of the vanadium was extracted after 5 stages.

EXAMPLE VI

This example illustrates the use of the novel extractant mixture of this invention. The same acidic leach liquor of Example V is treated with an extractant mixture in "Napoleum 470" containing 0.06 M tricaprylyl amine ("Alamine 336")
0.025 M 2-thenoyltrifluoroacetone
8% tributylphosphate.

The results of the extraction are tabulated below:

|  | Raffinate V$_2$O$_5$(g./l.) | Percent extraction | |
|---|---|---|---|
|  |  | Per stage | Cumulative |
| Stage: |  |  |  |
| 0 | 9.72 |  |  |
| 1 | 3.79 | 61.0 | 61.0 |
| 2 | Nil | 100.0 | 100.0 |
| 3 | Nil |  | 100.0 |
| 4 | Nil |  | 100.0 |
| 5 | Nil |  | 100.0 |

It will be noted that in this example, using the extractants of this invention, 100% of the vanadium was extracted after only 2 stages.

EXAMPLE VII

Following the amine solvent extraction of uranium from sulfuric acid leach liquors, the residual aqueous solution frequently contains vanadium (IV) and iron (III). This example illustrates the use of the extractant compositions of this invention to recover these metals.

Such a solution having a pH of 1.0 and containing 0.26 g./l. V$_2$O$_5$ as vanadium (IV) and 1.89 g./l. iron (III) was contacted with an equal volume of organic extractant solution for 15 minutes in a separatory funnel. The organic solution contained 0.1 molar

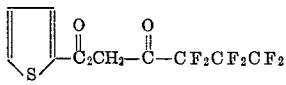

and 0.4 molar tri-n-octylphosphine oxide in Soltrol 170 solvent. On analysis of the aqueous phase, it was determined that 98% of the vaandium (IV) had been extracted and 91% of the iron (III) had been extracted.

When the experiment was repeated deleting the tri-n-octylphosphine oxide, only 16% of the vanadium and 5% of the iron (III) were extracted.

When the experiment was repeated deleting the fluorinated β-diketone, thus leaving only the tri-n-octylphosphine oxide in Soltrol 170, no extraction of either iron (III) or vanadium (IV) occurred.

What is claimed is:

1. A process for extracting vanadium ions from an aqueous acidic mixture containing tetravalent and pentavalent vanadium ions comprising
    contacting said acidic mixture at a pH of from about 0.1 to 3.0 with a water-immiscible organic solvent containing a two component extractant mixture comprising as one component alkyl phosphine oxides having from 10 to 50 carbon atoms and as the other component a fluorinated β-diketone having the formula

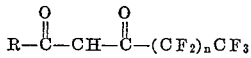

wherein R is a radical selected from the group consisting of
    (a) aromatic radicals containing from 6 to 14 ring carbon atoms, which may contain conventional substituents such as alkyl, halo nitro, alkoxy, and amino groups;
    (b) heterocyclic radicals containing five and six ring members wherein from one to two of the ring members may be selected from the group consisting of oxygen, sulfur and nitrogen, and which may contain conventional substituents such as alkyl, halo, nitro, alkoxy and amino groups; and
    (c) aliphatic and substituted aliphatic radicals; and $n$ has a value of 0 to 15,
to form an organic phase containing said vanadium ion separate from an aqueous phase; and removing said organic phase containing said vanadium ion from the aqueous phase.

2. The process of claim 1 wherein R is an aromatic radical.

3. The process of claim 1 wherein R is a heterocyclic radical.

4. The process of claim 1 wherein R is an aliphatic radical.

5. The process of claim 1 wherein the phosphine oxide is tri-n-octylphosphine oxide.

References Cited

UNITED STATES PATENTS

| | | | |
|---|---|---|---|
| 3,409,415 | 11/1968 | Moore | 23—312 ME |
| 3,206,277 | 9/1965 | Burwell | 23—312 ME |
| 3,206,276 | 9/1965 | Burwell | 23—312 ME |
| 3,154,390 | 10/1964 | Goren | 23—312 ME |
| 3,083,085 | 3/1963 | Lewis | 23—312 ME |
| 3,278,277 | 10/1966 | Goren | 23—312 ME |

FOREIGN PATENTS

| | | | |
|---|---|---|---|
| 895,676 | 5/1962 | Great Britain | 23—312 ME |

OTHER REFERENCES

Norman C. Li: NYO–1922–43, Program Report of Research on "Complexes in Solv. Ext. Chem.," April 1968, pp. 1–10.

Ishimori: Nippon Genshiryoru Gakkaishi, vol. 4, No. 2, 1962, pp. 117–125.

Nuclear Science Abstracts [TTA Extraction Curves, AECU–3879], vol. 13, January-February 1959, p 156, No. 1.

Nuclear Science Abstracts, vol. 10, No. 18A, Sept. 10, 1956, p. 1905.

Nuclear Sci. Abstracts, vol. 20, No. 21, Nov. 15, 1966, p. 4719.

Coleman et al.: Proceedings of International Conference on Peaceful Uses of Atomic Energy, vol. 28, 1958, pp. 278–288.

NORMAN YUDKOFF, Primary Examiner

S. J. EMERY, Assistant Examiner

U.S. Cl. X.R.

260—583 E, 593 H

UNITED STATES PATENT OFFICE
CERTIFICATE OF CORRECTION

Patent No. 3,764,274    Dated October 9, 1973

Inventor(s) Michael F. Lucid

It is certified that error appears in the above-identified patent and that said Letters Patent are hereby corrected as shown below:

Column 1, line 71, "rotated" should read -- roasted --

Column 2, line 8, "is" should read -- in --

Column 3, line 50, after "characterized", insert therefor -- by --

Column 6, line 6, after "137.6 p.p.m.", insert therefor -- 146.7 p.p.m. --

Column 7, line 10, "1202 cm. " should read -- 1220 cm. -- line 66, "159.2 p.p.m." should read -- 159.3 p.p.m. -- line 75, "62.25" should read -- 62.65 --

Column 9, lines 1 through 4, formula should read --

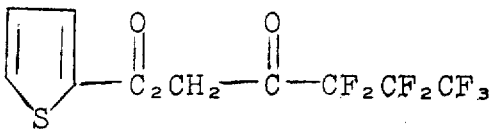

Signed and sealed this 12th day of March 1974.

(SEAL)
Attest:

EDWARD M. FLETCHER, JR.　　　　　C. MARSHALL DANN
Attesting Officer　　　　　　　　Commissioner of Patents